Feb. 20, 1973   A. J. URBONAS   3,717,088
APPLIANCES FOR CUTTING AN EGG SHELL
Filed Feb. 8, 1971   2 Sheets-Sheet 1
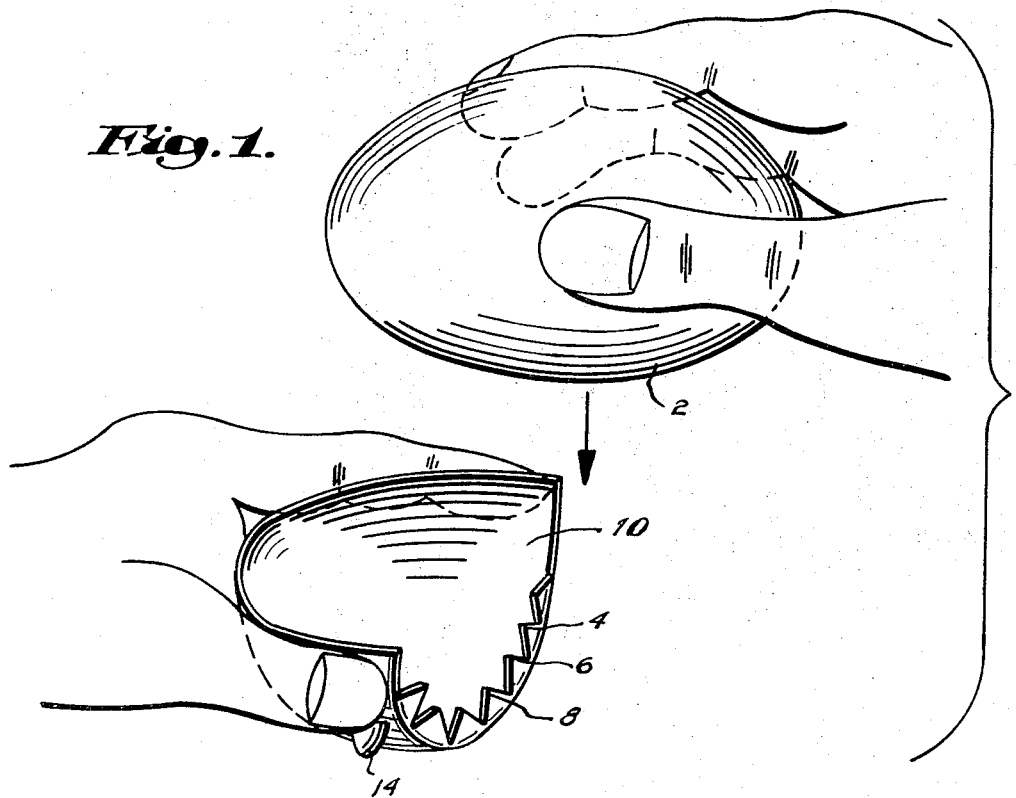
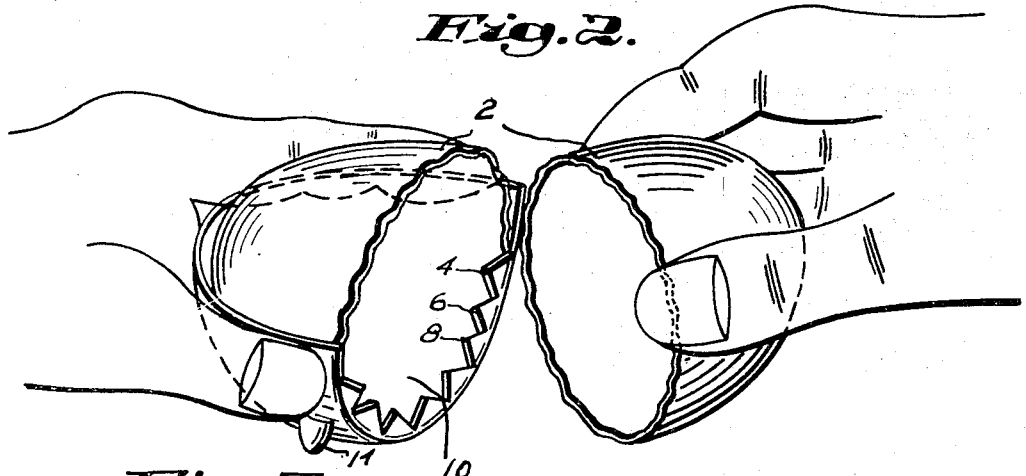
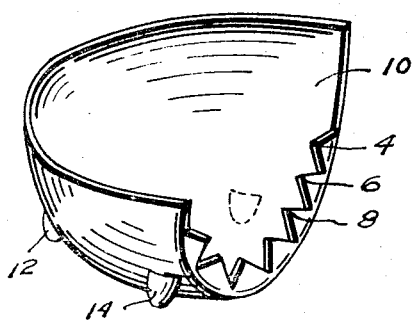
Inventor:
Algie J. Urbonas,
by Munro H. Hamilton
Attorney

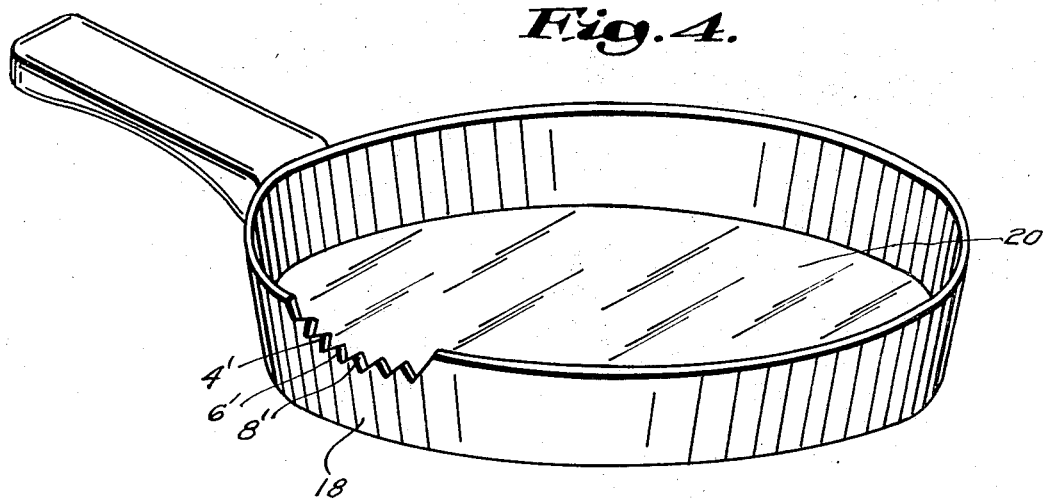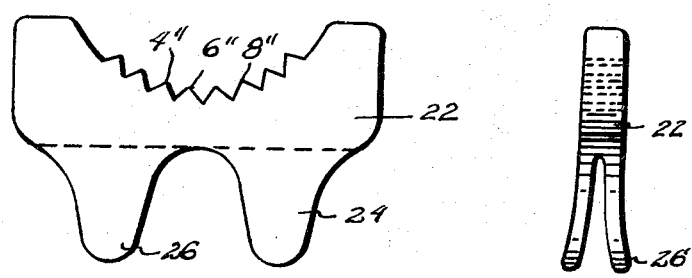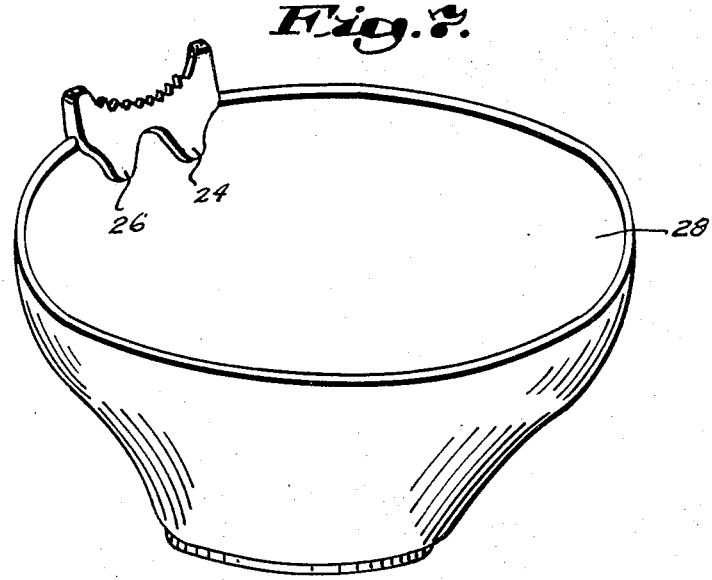

United States Patent Office 3,717,088
Patented Feb. 20, 1973

3,717,088
APPLIANCES FOR CUTTING AN EGG SHELL
Algie J. Urbonas, 3 Surrey Lane,
West Peabody, Mass. 01960
Filed Feb. 8, 1971, Ser. No. 113,261
Int. Cl. A47j 43/14
U.S. Cl. 99—568                                    1 Claim

ABSTRACT OF THE DISCLOSURE

A plurality of pointed cutting teeth supported in arcuately disposed converging relationship to one another provide a cutting edge against which an egg shell may be struck to form a relatively thin sharp line of cutting which divides the egg shell into two partially severed halves. Portions of the egg shell are pierced by thin sharp pointed tips of the teeth and are therefore cut without small fragments of the shell breaking off. The cutting teeth, in their arcuately disposed relationship to one another, are preferably combined with a holder body, but they may also be formed as an integral part of a cutting utensil or other working surface. The holder body cooperates with the teeth when engaged in an egg shell to facilitate manually pulling apart partially severed halves of the shell while edible portions of the egg are being removed.

---

This invention relates to a cutting device and more particularly to an appliance for use in cutting an egg shell along a median line of cutting which divides the egg shell into two partially severed halves.

Removing the edible portion of a fresh or uncooked egg from its outer shell portion is usually carried out either by breaking the egg shell with a knife or other sharp-edged appliance, or by striking the egg shell against an edge of a cooking utensil or other similar working surface. In either operation the curved or rounded surface of the egg shell coming into contact with an edge of the class indicated, tends to break in such a manner that tiny fragments of shell are formed, and in many cases, the shell fragments fall away and are mixed with subsequently cooked portions of the egg, greatly detracting from its edibility. In restaurants and other areas where food is served extensively, this may create a constant problem.

It is a chief object of the invention, therefore, to deal with the problem indicated and to devise an improved appliance for use in cutting an egg shell and removing edible portions of egg from within the egg shell;

It is a specific object of the invention to provide an appliance for cutting an egg shell along a thin sharp line without breaking off small fragments of the egg shell;

Another object is to provide a shell breaking appliance for eggs which facilitates separating a partially broken egg shell into two substantially equal halves while edible portions of the egg are dropped into a cooking utensil;

Still another object is to provide an egg shell cutting appliance which may be combined with a side of a cooking utensil or other desired supporting surface.

The nature of the invention and its other objects and novel features will be more fully understood and appreciated from the following description of a preferred embodiment of the invention selected for purposes of illustration and shown in the accompanying drawings, in which:

FIG. 1 is a diagrammatic view illustrating the appliance of the invention in a position for use and further indicating an egg being held in a position to be advanced against cutting teeth in the invention;

FIG. 2 is another diagrammatic view illustrating an egg shell which has been cut and pulled apart utilizing the appliance of the invention;

FIG. 3 is a detail perspective view of a modification of the appliance of the invention;

FIG. 4 is a perspective view showing the appliance of the invention in another modified form; and FIGS. 5, 6 and 7 illustrate still another modification of the appliance in which form it may be detachably secured to a cooking utensil or other desired working surface.

Referring more in detail to the structure shown in the drawings, FIG. 1 illustrates an egg of the usual type produced and sold in the poultry business. The egg has an outer shell portion denoted by the numeral 2. As indicated in FIG. 1, the egg is held in a user's hand in the customary position employed in lightly striking the egg against a surface or edge in order to carry out breaking of the shell 2.

In accordance with the present invention, I provide an improved appliance for breaking the egg open in order to remove edible portions of the egg without shell fragments falling away and being present in subsequently cooked portions of the egg. Essentially the appliance of the invention includes a plurality of thin spaced sharply pointed cutting teeth arranged in arcuately disposed converging relationship to one another, together with holder means for manually supporting the teeth in one hand in a position to be lightly struck by an egg held in the other hand of a user, as indicated in FIG. 1.

In one preferred embodiment, the appliance of the invention may be manually supported as shown in FIGS. 1 and 2. However, the device may take other forms as suggested in the modifications of FIGS. 3 to 7, inclusive, as will be hereinafter described.

Considering in greater detail the form of the invention shown in FIGS. 1 and 2, numerals 4, 6, 8, etc. refer to thin spaced apart sharply pointed teeth which are arranged in arcuately disposed converging relationship to one another in an arc of curvature which may generally correspond to the curved surface of the egg shell 2.

In the preferred form of the invention shown in FIGS. 1 and 2, the cutting teeth 4, 6, 8, etc. are supported on a holder body 10. The holder body, together with the teeth, may be formed of a material such as metal, plastic or other suitable substance from which rigid pointed cutting teeth may be formed. The holder 10 is preferably made with a concaved shape which roughly simulates a quarter section of an egg corresponding to the egg shell 2 and the inner surface of the holder body, thus provides a curved supporting side against which a half portion of the egg shell 2 may come to rest when pierced by the teeth 4, 6, 8, etc. This inner curved side thus limits the extent to which the teeth penetrate the shell, and since there are a limited number of teeth, there may be formed a line of cutting which extends partway around the lower surface of the egg shell 2. It will be observed that the holder 10 is of a shape which closely coincides with a quarter section of shell 2. Therefore, cutting is guided in such a manner that there is formed a thin sharp median line which divides the egg shell 2 into two partially severed halves.

It is pointed out that the teeth occur at an angle to the supporting surface of the holder body 10 and thus when the egg shell is struck against the teeth, and the teeth become engaged through the shell, there may be realized a cooperative relationship between the holder body and the teeth since they tend to retain one-half of the partially severed egg shell 2 when held in one hand, while the other half of the shell 2 may be pulled apart with the other hand, as suggested in FIG. 2.

I have found that by selecting a proper number and size of cutting teeth, a very thin, clean line of severance can be obtained and breaking off of shell fragments can be almost entirely eliminated. Thus the edible contents of the egg may be conveniently dropped into a pan or other utensil at the time the separation of the shell portion takes place without risk of shell fragments being present.

In FIG. 2, I have illustrated the holder body 10 and teeth 4, 6, 8, etc. supported by feet 12, 14, etc. on a desired work surface. In some instances, it may be desired to employ the appliance in this manner rather than being entirely held by hand. In such a usage of the appliance, the egg can be lightly struck against the teeth to form a line of cutting and the egg and holder may then be picked up and held while being pulled apart.

In FIG. 4, I have illustrated cutting teeth 4', 6', 8', etc. supported on a side wall 18 of a cooking utensil 20 such as a frying pan. In this modification, the egg, while held in one hand, may be struck against the teeth and immediately pulled inwardly of the utensil with the edible portion dropping into the cooking utensil. The same thin sharp line of cutting is realized and fragmentation of the shell is substantially prevented.

In the form of the invention shown in FIGS. 5, 6 and 7, cutting teeth as 4", 6", 8", etc. may be provided in the same arcuately disposed converging relationship and supported on a holder member 22 which may either be held in the hand or secured to a desired surface. In this form of the invention, the holder 22 is provided with clip portions as 24 and 26 which can be engaged over the edge of a dish 28 as suggested in FIG. 7. In this usage also, the egg may be lightly struck against the cutting teeth and while held thereagainst, a partially severed egg portion may be pulled inwardly with the edible portion of the egg dropping into the utensil 28.

From the foregoing description, it will be seen that I have disclosed a simple but efficient appliance for cutting and separating the shell of an egg, and by controlling the size and shape of the teeth, a clean line of cutting may be formed so that small fragments of egg shell are prevented from being formed and falling away with edible portions of the egg when the sections are pulled apart.

I claim:

1. A manually-held appliance for use in breaking the underside of the shell of a raw egg while held over a cooking utensil and pulling partially broken bottom sections of the egg apart from one another to drop edible portions of the egg into a utensil, said appliance comprising a hollow semi-hemispheroidal body to be gripped between the thumb and finger of one hand of a user and presenting a concaved egg supporting surface for receiving one end of the egg, said hemispheroidal body being open at its upper side to define a passageway through which an end of the egg held in the other hand of the user may be moved abruptly downwardly against the concaved surface with a percussive force, said hemispheroidal body further terminating along one side in a curved bottom edge portion, cutter means located along the curved edge portion and extending upwardly substantially at right angles thereto in a position to form two partially severed egg sections and to hold one partially broken egg section while the other section is pulled apart to drop the said edible portions into the utensil.

References Cited

UNITED STATES PATENTS

| | | | |
|---|---|---|---|
| 1,199,114 | 9/1916 | Robertson | 146—2 B |
| 3,179,322 | 4/1965 | Larson | 146—2 B X |
| 1,473,383 | 11/1923 | Riker | 146—2 B |

WILLIE G. ABERCROMBIE, Primary Examiner